Sept. 22, 1942.  W. K. KEARSLEY  2,296,676
CAMERA SHUTTER AND SYNCHRONIZER TESTING
Filed April 6, 1940
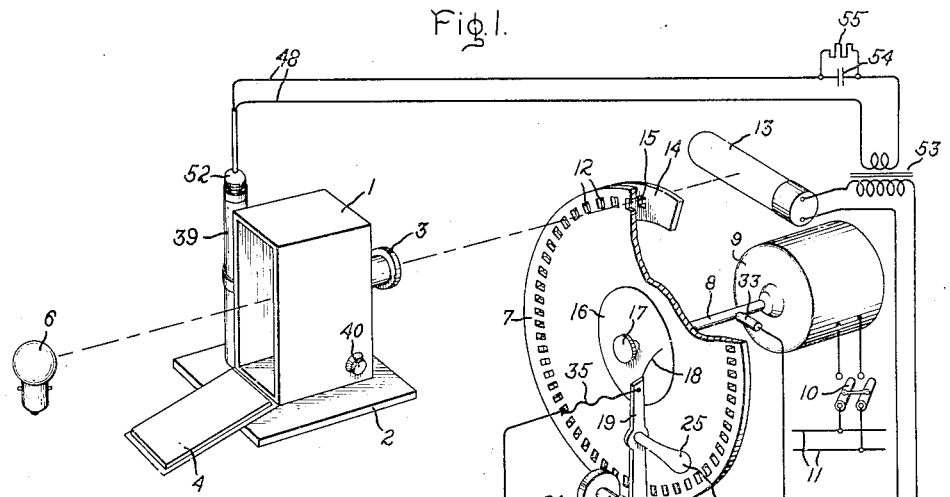
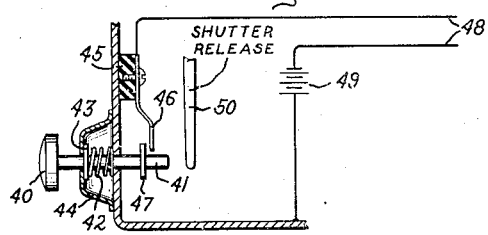
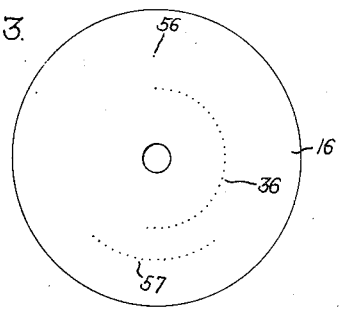
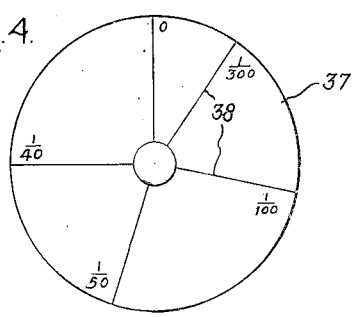
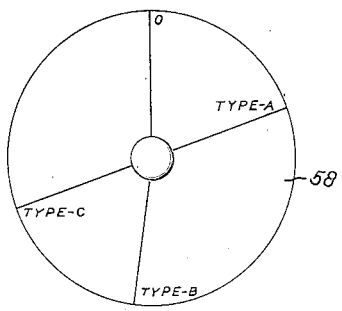
Inventor:
William K. Kearsley,
by Harry E. Dunham
His Attorney.

Patented Sept. 22, 1942

2,296,676

UNITED STATES PATENT OFFICE 2,296,676

CAMERA SHUTTER AND SYNCHRONIZER TESTING

William K. Kearsley, Schenectady, N. Y., assignor to General Electric Company, a corporation of New York Application April 6, 1940, Serial No. 328,343

1 Claim. (Cl. 234—36.5)

My invention relates to cameras and particularly to apparatus for use in determining the accuracy of the timing of camera shutters and in testing flash lamp synchronizers. It is the object of my invention to provide improved apparatus for such purposes which is simple in construction, reliable in operation, and inexpensive to manufacture.

My invention will be better understood from the following description taken in connection with the accompanying drawing and its scope will be pointed out in the appended claim.

Referring to the drawing, Fig. 1 is a diagrammatic view of one embodiment of my invention; Fig. 2 shows a detail of the camera represented in Fig. 1; Fig. 3 is an enlarged view of records made with my invention; and Figs. 4 and 5 are devices useful in reading such records.

In Fig. 1 the camera 1 is shown resting on the support 2 in a position to be tested. The camera has the lens 3, a shutter (not shown) of the "between the lens" type and a back 4 which opens up to give access to the interior of the camera. Arranged behind the camera is the light source 6 which, for example, may be a small incandescent lamp. In front of the camera is the metal disk 7 which is mounted on the shaft 8 of the synchronous motor 9, the motor being shown connected through the control switch 10 with the source 11 of alternating current which, for example, may be a 115 volt lighting circuit. The disk is provided with a row of equally spaced openings or slots 12 adjacent to its periphery, and arranged behind the row of openings is the photo-electric device 13 such as a photo-electric tube. Between the disk and the device is the mask 14 having the single opening 15 therein by which a beam of light from the source 6 passing through the camera shutter and the successive holes 12 to the photo-electric device is limited to the light passing through a single opening 12 at any one time. Thus, as the disk rotates while the shutter is open, the photoelectric device receives a series of light impulses. Inasmuch as the motor rotates at a known fixed speed and the number of holes in the disk is known, the total number of light impulses reaching the photo-electric device per second becomes known. In the apparatus which I have constructed the disk is provided with 60 holes and rotates at a speed of 30 revolutions per second, hence the photo-electric device receives 1800 light impulses per second and each impulse represents 1/1800 of a second.

For the purpose of making a record of the impulses during the time that the camera shutter is open I provide the paper record disk 16 which has an electrically conducting back adapted to make electrical connection with the disk 7. The paper disk is perforated at its center and is attached to the center of the disk 7 by the thumb screw 17 whereby it rotates therewith. A record of the output impulses of the photo-electric device is made on the paper disk by means of electric sparks. For this purpose, I provide a stylus comprising the wire 18 secured to one end of the arm 19 whose opposite end is enlarged to form the nut portion 20. This portion engages the threaded part 21 of the shaft 22 which is suitably supported from the base 23 by the bearing blocks 24. By means of the handle 25 which is of insulating material, the stylus is brought up to a position in which it touches the paper disk 16 when a record is to be made and is moved down to a position in which it is out of the way when the paper disk is being applied or removed. By means of the crank 26 having the insulated handle 27 thereon, the stylus may be shifted horizontally whereby the point of contact between the stylus and the record disk will move radially of the disk.

The photoelectric device 13 connects through the conductors 30 with the input side of the amplifier 31. The output side thereof connects through one wire 32 with the disk 7; for example, through the brush 33 engaging the motor shaft and connects through the wire 34 through the flexible connection 35 with the stylus arm 19. The voltage provided by the amplifier is sufficient, for example, 400 volts, to cause minute sparks to pass from the end of the stylus through the paper to the conducting back thereof, thereby burning a small hole in the paper or making a mark as each spark occurs. In Fig. 3, which shows an enlarged view of the paper disk 16, the row of dots 36 represents the spark marks made during an open interval of the camera shutter. Inasmuch as a spark occurs each time one of the holes 12 passes the hole in the mask the time represented by the spaces between the dots is the same as the time represented by the successive holes 12, namely 1/1800 of a second in the present case. Obviously, by counting up the number of dots in the row 36 one may easily determine the length of time during which the shutter was open. To facilitate the determination of the open time of the shutter and to avoid the inconvenience of having to count the dots when the row contains a large number thereof, I have provided the device 37 comprising a disk of transparent material such as celluloid which has a center pin adapted to fit the perforation in the disk 16 and which is divided off by the radial lines 38 marked in fractions of a second from a line of reference. If such a counter is placed on top of the paper record with one end of the row of dots coinciding with the zero radial line the length of the row may be readily read off on the counter in terms of shutter speed. If for making this record the shutter were set for $\frac{1}{50}$ of a second, the length of the row 36 would indicate that the speed of the shutter for that setting is approximately correct.

My invention is useful not only to determine the accuracy of the timing of camera shutters but also to test flash lamp synchronizers with which cameras of certain types are provided. The camera which I have illustrated is one of that type, being shown having attached thereto the casing 39 which contains a small electric battery and has a socket at the upper end to receive a flash lamp (not shown). The camera also has the push button 40 by which the operator in taking a picture first closes the battery circuit to ignite the flash lamp and then releases the camera shutter.

Referring to Fig. 2 the plunger 41 of the push button is resiliently held in its outermost position by the spring 42 which engages the collar 43, the small casing 44 forming a stop. Within the camera and attached to the wall thereof by the insulation 45 is the spring contact 46 which when the plunger is pushed by the operator contacts with the collar 47 on the plunger and thus closes the circuit 48 of the battery 49 by which in the ordinary use of the apparatus the flash lamp is ignited. By the further inward movement of the plunger the shutter release lever 50 is operated, the interval between the closing of the circuit and release of the shutter being presumably correct to insure the shutter being open during the peak of maximum light from the lamp. While the simple apparatus with which I have chosen to illustrate my invention is of course subject to considerable variation in the time between the closing of the circuit and the release of the shutter due to the personal factor, it will be understood that my invention is equally applicable to other forms of apparatus for the same purpose which are not subject to that disadvantage.

For testing the flash synchronizer whatever may be its construction, I cause the electric impulse due to the closing of the battery circuit by the plunger to produce an impulse in the photoelectric tube circuit. This I bring about by substituting the plug 52 for the flash lamp in the battery casing 39 and connecting the terminals of the plug with the photoelectric tube circuit through the transformer 53. In that connection I preferably employ the capacitor 54 shunted by grid leak resistor 55 to insure that but one impulse is transmitted to the photoelectric tube circuit even though there may be a slight fluttering at the contacts 46 and 47.

When the flash synchronizer is to be tested the operator presses the plunger 40 in the same manner that he usually does in taking a picture. The first movement of the plunger closes the battery circuit thereby producing an impulse in the photoelectric tube circuit which being amplified to a sparking voltage produces a single burn or mark on the record disk. That mark is represented in Fig. 3 by the dot 56. As the plunger is pushed further it actuates the shutter release lever and during the shutter open interval the row of burns or marks, shown as the dots 57, is produced on the record paper. The interval which elapsed between the dot 56 at which the flash lamp would have been fired and any point in the shutter open interval is readily determined by measuring the angle included therebetween.

Various types of flash lamps require different times for the light flash to reach its peak value after ignition, the particular time required for each type of lamp being usually published by the lamp manufacturer. Having made a record as described above, one may readily determine whether or not the synchronizing apparatus of his camera or the manner in which he is accustomed to operate it is adapted for use with a particular lamp which he employs or wishes to employ. To facilitate this determination I have provided the device 58 which is similar in construction to the device 37 but has thereon radial lines whose positions are proportional to the elapsed time intervening between the application of an igniting voltage, the zero line, and the occurrence of the light peaks for three types of flash lamps. By placing one of these counters over the paper record with the single dot 56 positioned on the zero line, one may see at a glance whether or not the open period of the shutter will include the light peak with the particular flash lamp employed. The record 56, 57 would indicate, for example, that the operation of the synchronizer was suitable for a type B lamp.

What I claim as new and desire to secure by Letters Patent of the United States is:

Shutter testing apparatus comprising a source of light, a photo-electric device arranged to receive a light beam therefrom controlled by a shutter to be tested, a conducting disk having means for rotating it at a fixed predetermined speed and having therein a predetermined number of equally spaced openings arranged in the path of said beam, said disk having means whereby a record disk may be detachably mounted thereon, means for amplifying the output impulses of said device, a stylus arranged adjacent to said conducting disk, and means for applying said amplified impulses between said conducting disk and said stylus to mark said record disk.

WILLIAM K. KEARSLEY.